United States Patent
Cheung et al.

(10) Patent No.: US 7,693,058 B2
(45) Date of Patent: Apr. 6, 2010

(54) METHOD FOR ENHANCING TRANSMISSION QUALITY OF STREAMING MEDIA

(75) Inventors: Gene Cheung, Tokyo (JP); Wai-tian Tan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2248 days.

(21) Appl. No.: 10/310,196

(22) Filed: Dec. 3, 2002

(65) Prior Publication Data
US 2004/0105463 A1 Jun. 3, 2004

(51) Int. Cl.
*H04J 3/16* (2006.01)
(52) U.S. Cl. .................. 370/231; 370/252; 370/468
(58) Field of Classification Search ......... 370/229–232, 370/252, 253, 389, 400, 401, 412, 413, 415, 370/417, 464, 465, 468; 709/219, 221
See application file for complete search history.

(56) References Cited

U.S. PATENT DOCUMENTS

| 6,408,005 | B1 * | 6/2002 | Fan et al. .................... 370/412 |
| 7,277,456 | B2 * | 10/2007 | Henry et al. ................. 370/468 |
| 2002/0150102 | A1 * | 10/2002 | Janko et al. .................. 370/392 |
| 2002/0150123 | A1 * | 10/2002 | Ro ............................. 370/465 |
| 2003/0067872 | A1 * | 4/2003 | Harrell et al. ............... 370/229 |
| 2005/0243745 | A1 * | 11/2005 | Stanwood et al. ........... 370/280 |

FOREIGN PATENT DOCUMENTS

WO WO00/21231 4/2000

OTHER PUBLICATIONS

Majumda, A.; Sachs, D.G.; Kozintsev, I.V.; Ramchandran, K.; Yeung, M.M., "Multicast and unicast real-time video streaming over wireless LANs," Circuits and Systems for Video Technology, IEEE Transactions on , vol. 12, No. 6 pp. 524-534, Jun. 2002.*
K Brown—"The RTCP Gateway: Scaling Real-Time Control Bandwidth for Wireless Networks"—Computer Communications—vol. 23 No. 14-15—Aug. 2000—pp. 1470-1483.
Hari Balakrishnan et al—"A Comparison of Mechanisms for Improving TCP Performance Over Wireless Links"—IEEE/ACM Transactions on Networking—vol. 5 No. 6—Dec. 1997—pp. 756-769.
Andrea Fieger et al—"Transport Protocols Over Wireless Links"—Proceedings of the IEEE International Symposium on Computers and Communications—Jul. 1997—pp. 456-460.
T. Yoshimura, et al,; "Rate Robustness Control with RTP Monitoring Agent for Mobile Multimedia Streaming"; Multimedia Laboratories, NTT DoCoMo, Inc.; 5 pages.

* cited by examiner

*Primary Examiner*—Aung S Moe
*Assistant Examiner*—Kerri M Rose

(57) ABSTRACT

A method for enhancing transmission quality of streaming media. A first bandwidth for a first communication link and a second bandwidth for a second communication link of a network are determined. Provided the first bandwidth is greater than the second bandwidth, a first excess bandwidth is utilized to improve transmission quality in the first communication link, wherein said the excess bandwidth is related to a difference of the first bandwidth minus the second bandwidth. Provided the second bandwidth is greater than the first bandwidth, a second excess bandwidth is utilized to improve transmission quality in the second communication link, wherein the second excess bandwidth is related to a difference of the second bandwidth minus the first bandwidth.

22 Claims, 5 Drawing Sheets

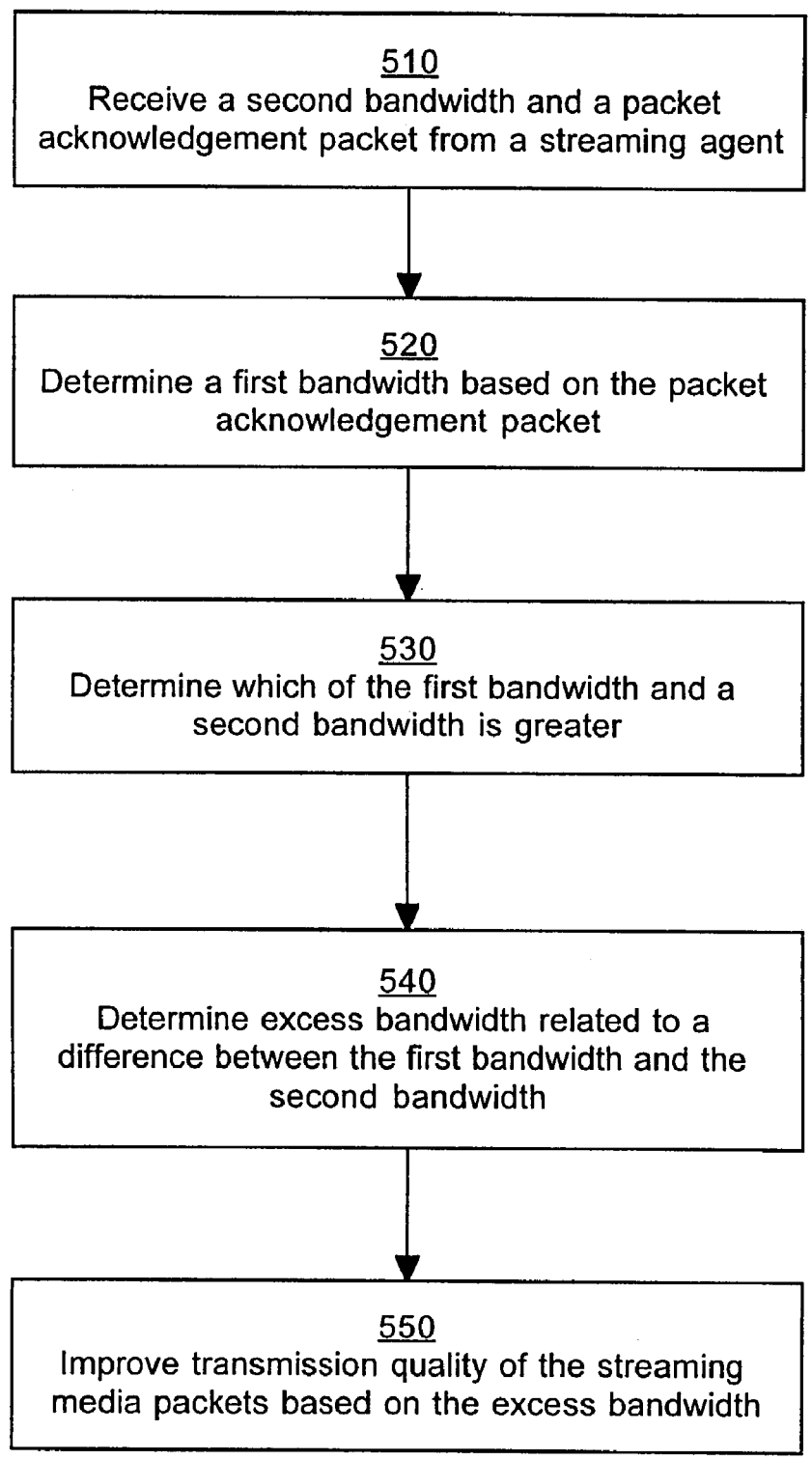

METHOD FOR ENHANCING TRANSMISSION QUALITY OF STREAMING MEDIA

FIELD OF INVENTION

Various embodiments of the present invention relate to the field of network communications.

BACKGROUND OF THE INVENTION

As use of computer networks and the Internet continues to expand, streaming media use also continues to grow. One of the most desirable applications of streaming media is to present the streaming media on a wireless client. Typically, streaming media is streamed from a server over a wired network to a wireless base station that transmits the streaming media over a wireless connection to a client device. In this environment, there is typically a transmission rate mismatch due to the maximum bandwidth of the wired network (e.g., the server to the wireless base station) being different than the maximum bandwidth of the wireless link (e.g., wireless base station to client).

In order to accommodate the transmission rate mismatch in two wired networks, end-to-end congestion control is often implemented. In a wired network, data loss is typically directly related to the transmission rate. As such, it is possible to reduce the percentage of data packets lost by reducing the transmission rate. Similarly, in the case when media is streamed from a server in a wired network infrastructure to a wireless client via a last hop wireless link, conventional practice is to ignore the effects of the last hop wireless link and employ endpoint media adaptations based solely on observable endpoint statistics. Since endpoint statistics are aggregated across all wired and wireless links, it is impossible to distinguish the respective conditions of the wired and wireless networks.

The resulting problem with the conventional practice is that the server can confuse losses due to wireless link failure as losses due to wired network congestion given only endpoint statistics. If losses are due to wired network congestion, then the server should perform endpoint congestion control and reduce sending rate. Typical congestion control algorithms decrease the sending rate with increasing round trip time and packet loss rates between two endpoints. On the other hand, if losses are due to wireless link failure, then the server should increase the error resiliency of the transmitting media stream while keeping the same sending rate. By not being able to distinguish the two different types of losses, in the case when losses are caused by wireless link failure, the server confuses them as wired network congestion losses and will unnecessarily perform congestion control and reduce the sending rate. The end result is a decrease in performance.

It has been proposed to solve this problem is a Real-time Transport Protocol (RTP) monitoring agent—a network agent, placed at the intersection of wired network and wireless link, that monitors existing streaming flows and periodically sends statistical feedback in the form of RTP Control Protocol (RTCP) reports back to the senders of the flows. As part of the RTP monitoring agent design, a shaping point, placed in front of the RTP monitoring agent, adjusts the outgoing rate of all packet traffic to the rate of the radio link.

The shaping point operates in the following manner. Let $R1$ be the permissible bandwidth of the wired network as determined by a standard wired network congestion control algorithm, based on wired network endpoint observable round trip time and packet loss rate. Let $R2$ be the maximum sending rate permissible for the wireless link, as determined by the base-station during wireless link resource allocation phase of the connection setup. In the event that $R1<R2$, the shaping point does nothing, and the streaming server sends at rate $R1$ as a result of the default behavior of the wired congestion control algorithm. In the event that $R1>R2$, the shaping point drops packets before packet arrival at the RTP monitoring agent until the server reacts to the drops by reducing the sending rate to $R2$ due to perceived wired network congestion control.

In particular, when $R1<R2$, the shaping point does not drop packets and the RTCP reports from the agent have reliable statistics of the wired network. Alternatively, in the case when $R1>R2$, the shaping point drops packets before packet arrival at the agent to reduce sending rate to $R2$. Depending one whether $R1<R2$ or $R1>R2$, the server can gather certain information. However, at any given time the server does not know whether $R1<R2$ or $R1>R2$. In the absence of that knowledge then, the server can only induce the following information: (1) the smaller of $R1$ and $R2$, which is the resulting server sending rate, (2) an upper bound of the wired packet loss condition, and (3) packet loss in the wireless link only.

SUMMARY OF THE INVENTION

Various embodiments of the present invention, a method for enhancing transmission quality of streaming media, are presented. In one embodiment, a first bandwidth for a first communication link and a second bandwidth for a second communication link of a network are determined. Provided the first bandwidth is greater than the second bandwidth, a first excess bandwidth is utilized to improve transmission quality in the first communication link, wherein said the excess bandwidth is related to a difference of the first bandwidth minus the second bandwidth. Provided the second bandwidth is greater than the first bandwidth, a second excess bandwidth is utilized to improve transmission quality in the second communication link, wherein the second excess bandwidth is related to a difference of the second bandwidth minus the first bandwidth.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a flowchart illustrating a process of enhancing transmission quality of streaming media at a media server in accordance with one embodiment of the present invention.

BEST MODE(S) FOR CARRYING OUT THE INVENTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1:
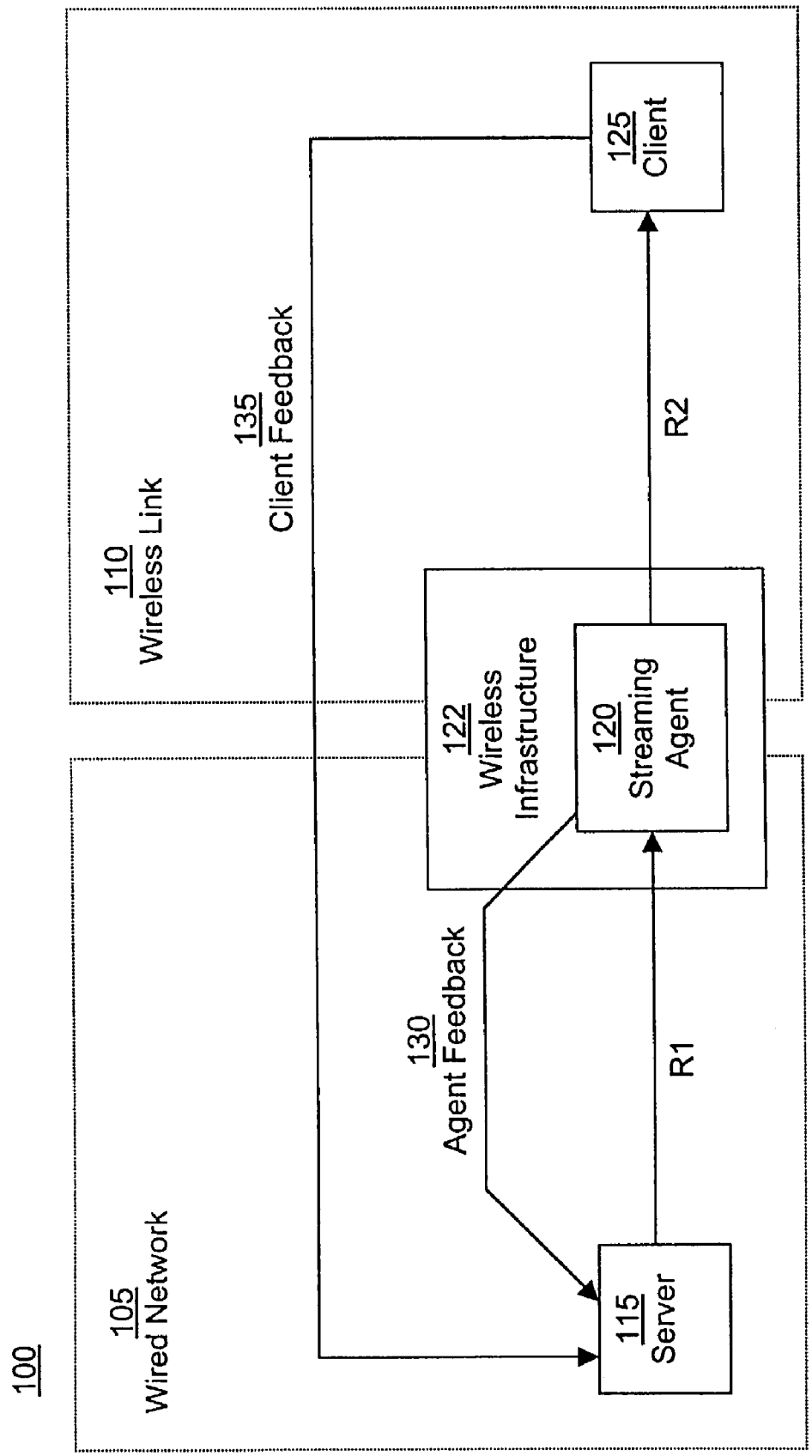
FIG. 1 is a block diagram of a system for enhancing transmission quality of streaming media in accordance with one embodiment of the present invention.

FIG. 1 is a block diagram of a system 100 for enhancing transmission quality of streaming media in accordance with one embodiment of the present invention. In one embodiment, system 100 is a distributed computer network comprising wired network 105 and wireless link 110. In one embodiment, wired network 105 comprises server 115 and wireless link 110 comprises client device 125. System 100 also comprises streaming agent 120 located at an intersection of wired network 105 and wireless link 110. In one embodiment, streaming agent 120 is located at wireless infrastructure 122 coupled to wired network 105 for transmitting streaming media to client device 125 over wireless link 110. In one embodiment, wireless infrastructure 122 is a wireless base station.

In one embodiment, system 100 is a server-client streaming media system, where the media is streamed from server 115 in wired network 105 and is delivered to wireless client device 125 via last hop wireless link 110. In one embodiment, the streaming media is audio media. In another embodiment, the streaming media is video media. It should be appreciated that the media streamed may be any type of data for streaming information, and is not limited to the above mentioned embodiments.

Figure 2:
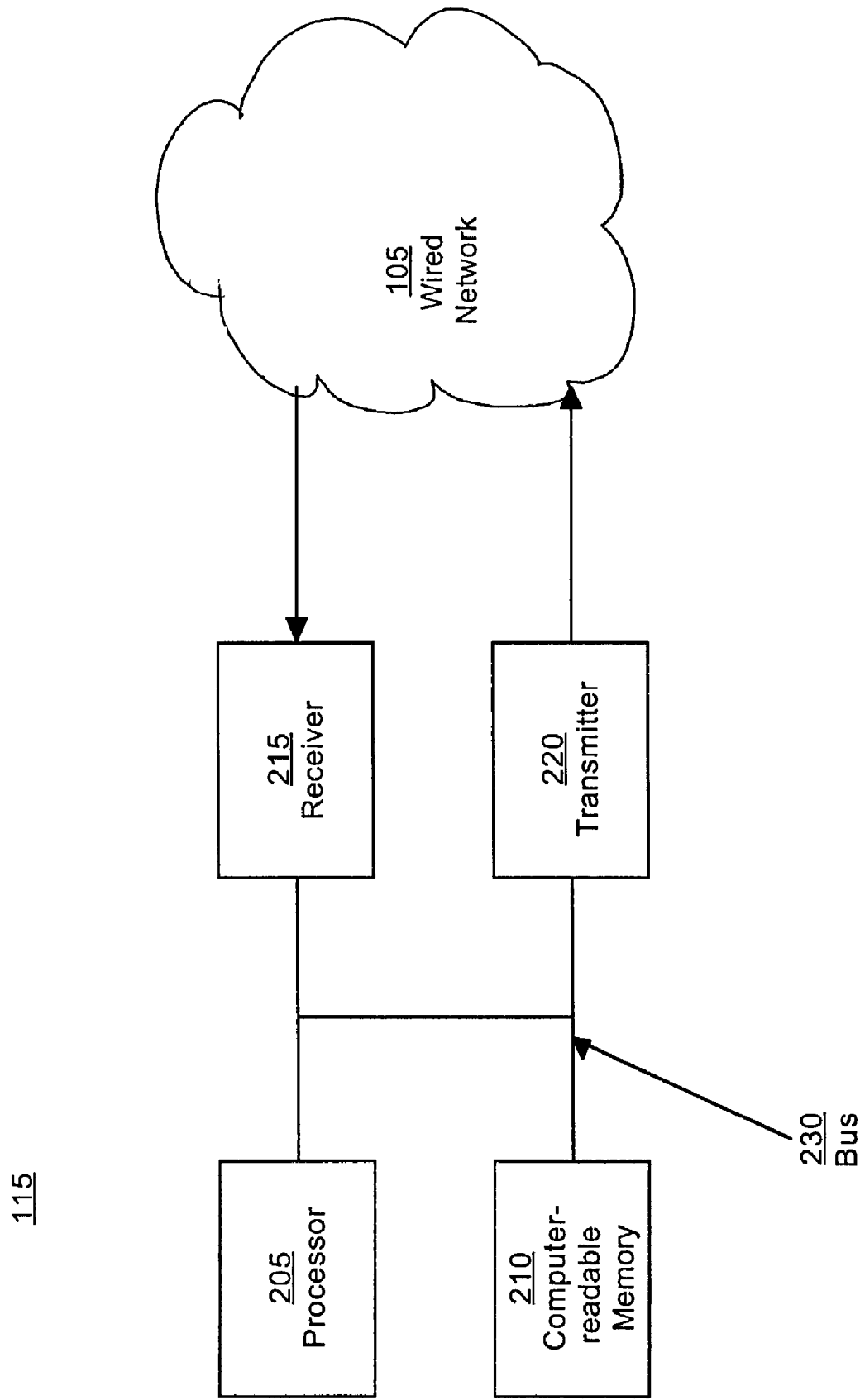
FIG. 2 is a block diagram of a media server in accordance with one embodiment of the present invention.

FIG. 2 is a block diagram of server 115 in accordance with one embodiment of the present invention. Server 115 comprises processor 205 coupled to bus 230, computer-readable memory 210 coupled to bus 230, receiver 215 coupled to bus 230 and transmitter 220 coupled to bus 230. In one embodiment, processor 205 is operable to perform a process for enhancing transmission quality of streaming media (e.g., process 300 of FIG. 3 or process 500 of FIG. 5). Receiver 215 is configured to receive at least one packet acknowledgement packet from streaming agent 120 of FIG. 1 over wired network 105. Transmitter 220 is configured to transmit streaming media data packets over wired network 105. It should be appreciated that computer-readable memory 210 may comprise computer readable volatile memory (e.g., random access memory, static RAM, dynamic, RAM, etc.) for storing information and instructions for processor 205 and/or a computer readable non-volatile memory (e.g., read only memory, programmable ROM, flash memory, EPROM, EEPROM, etc.) for storing static information and instructions for processor 205.

With reference to FIG. 1, server 115 transmits streaming media to streaming agent 120 over wired network 105, wherein wired network 105 has a maximum bandwidth R1 (e.g., wired network bandwidth). The streaming media is then transmitted to client device 125 over wireless link 110, wherein wireless link 110 has a maximum bandwidth R2 (e.g., wireless link bandwidth). In one embodiment, streaming agent 120 is located at wireless infrastructure 122 coupled to wired network 105. In the present embodiment, streaming agent 120 receives the streaming media where the media is then transmitted wirelessly to client device 125.

In one embodiment, bandwidth R1 is the maximum permissible bandwidth in wired network 105, as determined by a standard network congestion control technique using observable wired network 105 endpoint round trip time and packet loss rate. In one embodiment, the endpoint roundtrip time and packet loss rate for wired network 105 are determined at server 115 using feedback information transmitted to server 115 from streaming agent 120 as agent feedback 130. Bandwidth R2 is the maximum permissible bandwidth of wireless link 110, as determined by the wireless infrastructure (e.g., a wireless base station) during the wireless link resource allocation phase of the wireless session setup.

In one embodiment, streaming agent 120 is configured to determine bandwidth R2 from wireless infrastructure 122 and to inform server 115 of bandwidth R2 prior to the start of a streaming session. Streaming agent 120 is also configured to provide agent feedback 130 to server 115, wherein agent feedback 130 comprises packet acknowledgment packets (ACKs). In one embodiment, the ACKs are used by server 115 to determine instantaneous values of bandwidth R1 as well as wired network losses.

Client device 125 is an electronic device for receiving streaming media from server 115. In one embodiment, client device 125 is a portable computer system (e.g., a laptop computer) configured to render streaming media. In another embodiment client device 125 is a personal digital assistant (PDA) configured to render streaming media. It should be appreciated that client device 125 may be any type of device for rendering streaming media, and is not limited to the above mentioned embodiments. In one embodiment, client device 125 transmits client feedback 135 to server 115.

Using agent feedback 130 in combination with the client feedback 135, server 115 is able to distinguish packet losses in wired network 105 from that of packet losses in wireless link 110. As a result, server 115 has knowledge of bandwidth R1 and bandwidth R2 as well as knowledge of packet losses in wired network 105 and wireless link 110 at any given time. Similarly, in one embodiment, streaming agent 120 has knowledge of bandwidth R1, bandwidth R2 and packet losses in wired network 105 at any time.

Embodiments of the present invention allow server 115 to fully identify the following four parameters: (1) maximum permissible transmission rate in wired network 105 (e.g. bandwidth R1); (2) maximum permissible transmission rate in wireless link 110 (e.g. bandwidth R2); (3) packet losses in wired network 105; and (4) packet losses in wireless link 110. Utilizing bandwidth R1 and bandwidth R2, it is possible for server 115 to transmit streaming media at the appropriate rate equal to the smaller of bandwidth R1 and bandwidth R2. In addition, server 115 and streaming agent 120 can exploit any excess bandwidth in wired network 105 to correct packet losses in wired network 105 and can similarly exploit any excess bandwidth in wireless network 110 to correct packet losses in wireless network 110. Based on the excess bandwidth, server 115 can improve transmission quality of the streaming media in wired network 105 or wireless network 110.

In one embodiment, together with the packet losses in wired network 105 and the packet losses in wireless link 110, server 115 and the streaming agent 120 can further optimize the error control mechanisms in any excess bandwidth that is available. For example, server 115 not only knows the amount of excess bandwidth in wired network 105, server 115 also knows the loss characteristics of wired network 105 so that server 115 can intelligently choose between a number of techniques for improving transmission quality of the streaming media.

In one embodiment, packet retransmission is used to improve transmission quality. In another embodiment, forward error correction is used to improve transmission quality. It should be appreciated that any number techniques for transmission quality can be used, either individually or in combination. The technique or techniques used is determined by server 115 based on prevailing network conditions wired network 105 and wireless link 110. For example, if losses in the network (e.g., system 100) occur in bursts but transmission delay is low, retransmissions are often preferred. On the other hand, if losses are relatively uniform or when transmission delay is excessive, error control based on forward error correction may be preferable. Due to its ability to identify and intelligently exploit excess resources in different parts of the network path, embodiments of the present invention can significantly improve the transmission quality of the streaming media received at client device 125.

Figure 3:
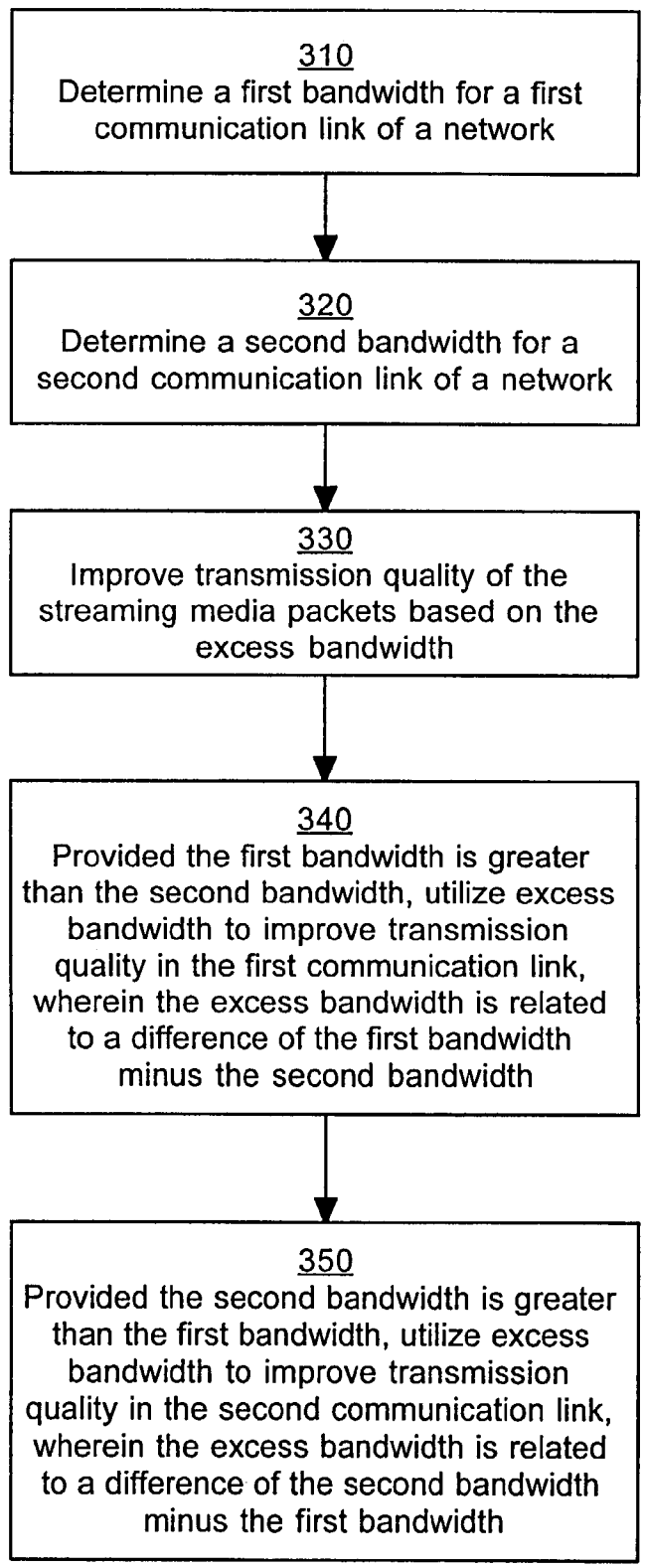
FIG. 3 is a flowchart illustrating a process of enhancing transmission quality of streaming media in accordance with one embodiment of the present invention.

FIG. 3 is a flowchart illustrating a process 300 of enhancing transmission quality of streaming media in accordance with one embodiment of the present invention. In one embodiment, process 300 is carried out by processors and electrical components under the control of computer readable and computer executable instructions. Although specific steps are disclosed in process 300, such steps are exemplary. That is, the embodiments of the present invention are well suited to performing various other steps or variations of the steps recited in FIG. 3.

At step 310 of FIG. 1, a first bandwidth (e.g., bandwidth R1 of FIG. 1) for a first communication link of a network is determined. In one embodiment, the first communication link is a wired network (e.g., wired network 105 of FIG. 1). In another embodiment, the first communication link is a wired link. In one embodiment, the first bandwidth is determined at a server (e.g., server 115 of FIG. 1) utilizing a congestion control mechanism.

At step 320, a second bandwidth (e.g., bandwidth R2 of FIG. 1) for a second communication link of network is determined. In one embodiment, the second communication link is a wireless link (e.g., wireless link 115 of FIG. 1). In one embodiment, the second bandwidth is determined at a streaming agent (e.g., streaming agent 120 of FIG. 1) located at an intersection of the wired link and the wireless link, wherein the second bandwidth is determined during resource allocation of the wireless link.

In one embodiment, step 310 occurs prior to step 320. In another embodiment, step 320 occurs prior to step 310. In another embodiment, steps 310 and 320 occur simultaneously. It should be appreciated that step 310 and 320 can occur in any order, can overlap, or occur simultaneously, and are not limited solely to the embodiments described herein. In one embodiment, a streaming agent is operable to determine the second bandwidth and transmit the second bandwidth to a server. The streaming agent also provides agent feedback to the server, allowing the server to determine the first bandwidth.

Figure 4:
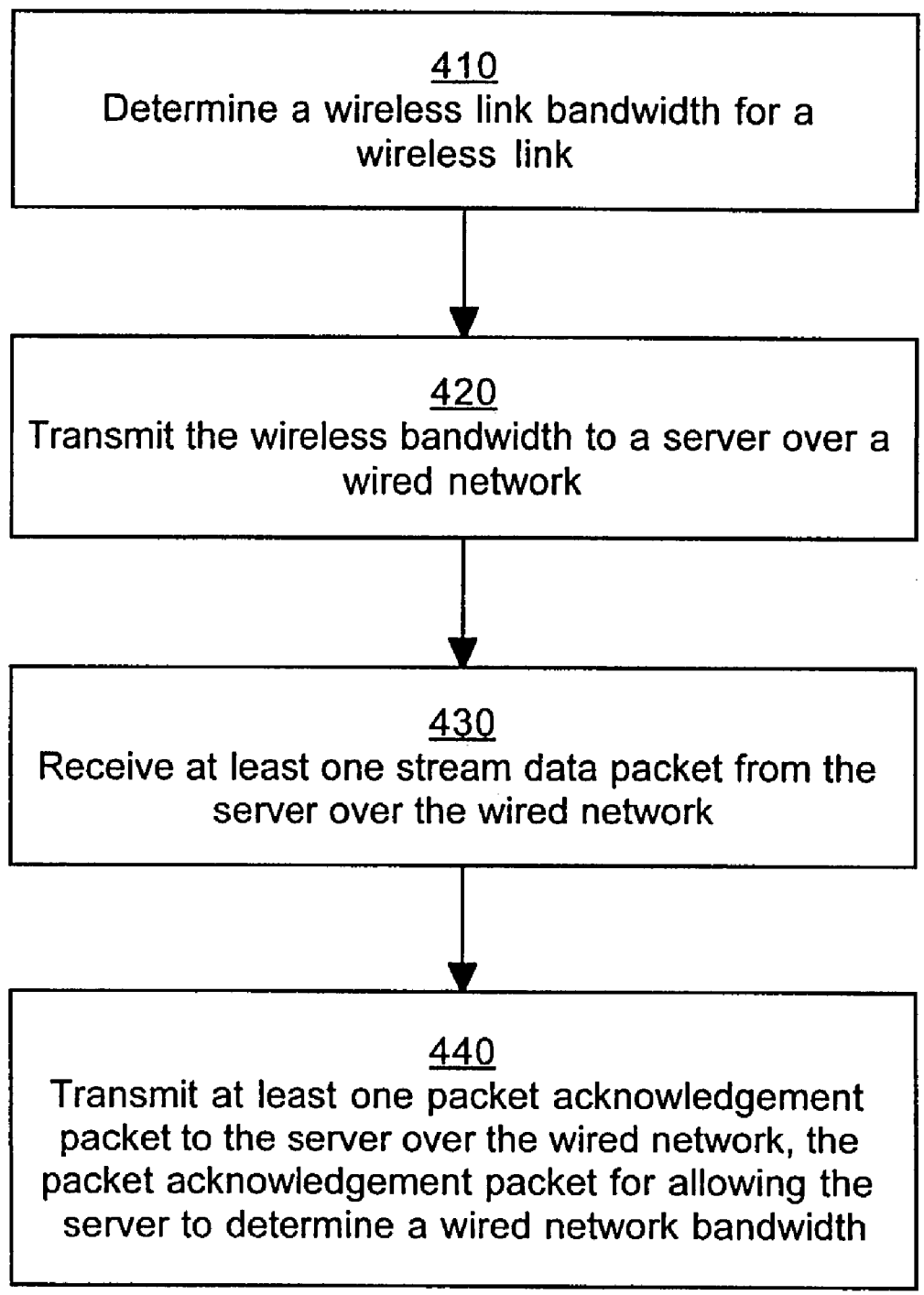
FIG. 4 is a flowchart illustrating a process of enhancing transmission quality of streaming media at a streaming agent in accordance with one embodiment of the present invention.

FIG. 4 is a flowchart illustrating a process 400 of enhancing transmission quality of streaming media at a streaming agent in accordance with one embodiment of the present invention. In one embodiment, process 400 is carried out by processors and electrical components under the control of computer readable and computer executable instructions. Although specific steps are disclosed in process 400, such steps are exemplary. That is, the embodiments of the present invention are well suited to performing various other steps or variations of the steps recited in FIG. 4. In one embodiment, process 400 is executed at a streaming agent (e.g., streaming agent 120 of FIG. 1) located at an intersection of a wired network and a wireless link.

At step 410 of process 400, a wireless link bandwidth of (e.g., bandwidth R2 of FIG. 1) a wireless link is determined. In one embodiment, the wireless link bandwidth is determined during resource allocation of the wireless link.

At step 420, the wireless link bandwidth (e.g., information to determine the wireless link bandwidth) is transmitted to a server over a wired network. In one embodiment, the server is configured to transmit streaming media packets over the wired network and the wireless link to a client device. At step 430, at least one streaming data packet from is received from the server over the wired network.

At step 440, at least one packet acknowledgement packet is transmitted to the server over the wired network. The packet acknowledgement packet is for allowing the server to determine a wired network bandwidth (e.g., bandwidth R1 of FIG. 1).

FIG. 5 is a flowchart illustrating a process 500 of enhancing transmission quality of streaming media at a media server in accordance with one embodiment of the present invention. In one embodiment, process 500 is carried out by processors and electrical components under the control of computer readable and computer executable instructions. Although specific steps are disclosed in process 500, such steps are exemplary. That is, the embodiments of the present invention are well suited to performing various other steps or variations of the steps recited in FIG. 5. In one embodiment, process 500 is executed at a streaming server (e.g., server 115 of FIGS. 1 and 2) located at an intersection of a wired network and a wireless link.

At step 510 of process 500, a second bandwidth for a second communication link of a network and a packet acknowledgement packet (e.g., and ACK) is received from a streaming agent (e.g., streaming agent 120 of FIG. 1). In one embodiment, the second communication link is a wireless link. In one embodiment, the second bandwidth and the ACK are received at a receiver (e.g., receiver 215 of FIG. 2). The second bandwidth is determined at the streaming agent located at an intersection of the second communication link and a first communication link. In one embodiment, the ACK is transmitted as agent feedback (e.g., agent feedback 130 of FIG. 1) from the streaming agent.

At step 520, a first bandwidth for the first communication link of the network is determined based on the packet acknowledgement packet received from the streaming agent. In one embodiment, the first communication link is a wired network.

At step 530, it is determined which of the first bandwidth and the second bandwidth is greater. At step 540, excess bandwidth related to a difference between the first bandwidth and the second bandwidth is determined. At step 550, transmission quality of the streaming media packets is improved based on the excess bandwidth.

With reference to FIG. 3, at step 330, as with step 550 of FIG. 5, transmission quality of the streaming media packets is improved based on the excess bandwidth. Provided the first bandwidth is greater than the second bandwidth, as shown at step 340, excess bandwidth is utilized to improve transmission quality in the first communication link. The excess bandwidth is related to a difference of the first bandwidth minus the second bandwidth. In one embodiment, the excess bandwidth is utilized to provide data packet retransmission over the first communication link.

For example, consider the situation where the first communication link is a wired network and the second communication link is a wireless link. Where bandwidth R1 is greater than bandwidth R2, the server will send a media stream at the second bandwidth (e.g., the smaller bandwidth) with the appropriate error resiliency over the wired network. The streaming agent monitors the arrival of the stream and uses the excess bandwidth in the wired link to correct losses in the wired link. For example, the streaming agent can request retransmissions (ARQ) of packets lost in the wired link from the server.

In one embodiment, the streaming agent monitors the Realtime Transport Protocol (RTP) sequence number space of the media stream, sends ACKs back to the server to acknowledge packet arrivals, and drops duplicated packets to keep the outgoing transmission rate no larger than bandwidth R2. Using the ACKs from the streaming agent, the server can perform application-level retransmission schemes. Retransmission is used to improve transmission quality of the streaming media in the wired network because the small delay allows for retransmission even for a small buffer and because retransmission schemes are less sensitive to burstiness in the packet loss process.

Provided the second bandwidth is greater than the first bandwidth, as shown at step 350, excess bandwidth is utilized to improve transmission quality in the second communication link. The excess bandwidth is related to a difference of the second bandwidth minus the first bandwidth. In one embodiment, the excess bandwidth is utilized to provide forward error correction over the second communication link.

For example, consider the situation where the first communication link is a wired network and the second communication link is a wireless link. Where bandwidth R2 is greater than bandwidth R1, the streaming agent can use the excess bandwidth in the wireless network to correct losses in the wireless link. For example, the streaming agent will supply additional forward error correction at the network junction (e.g., the wireless infrastructure), and transmit a media stream at bandwidth R1 tailored for the combined condition of the wired network and the wireless network less the effect of the to-be-added forward error correction. At the network junction, the streaming agent will add on additional forward error correction using the excess bandwidth. Forward error correction is often used to improve transmission quality of the streaming media in the wireless network due to the large wireless link delay of common cellular network. Furthermore, forward error correction is lightweight in implementation, which allows for less overhead in networks where a large number of streams traverse the same wireless infrastructure simultaneously.

In one embodiment, streaming media data packets are transmitted to a client device at a transmitter (e.g., transmitter 220 of FIG. 2). In one embodiment, the streaming media packets are transmitted over a wired network to a wireless infrastructure for transmission over a wireless link to the client device.

Various embodiments of the present invention, a method for enhancing transmission quality of streaming media, are thus described. While the present invention has been described in particular embodiments, it should be appreciated that the present invention should not be construed as limited by such embodiments, but rather construed according to the below claims.

What is claimed is:

1. A method for enhancing transmission quality of streaming media, said method comprising:
  receiving said streaming media from a server;
  determining a first bandwidth for a first communication link of a network, wherein said first bandwidth is determined by transmitting at least one packet acknowledgement packet to said server over said network in response to said receiving said streaming media, such that said first bandwidth is determined using observed endpoint roundtrip time of said streaming media and said at least one packet acknowledgement packet at said server;
  determining a second bandwidth for a second communication link of said network;
  provided said first bandwidth is greater than said second bandwidth, utilizing a first excess bandwidth to improve transmission quality in said first communication link, wherein said first excess bandwidth is related to a difference of said first bandwidth minus said second bandwidth; and
  provided said second bandwidth is greater than said first bandwidth, utilizing a second excess bandwidth to improve transmission quality in said second communication link, wherein said second excess bandwidth is related to a difference of said second bandwidth minus said first bandwidth.

2. The method as recited in claim 1 wherein said first bandwidth is a permissible transmission bandwidth for said first communication link.

3. The method as recited in claim 1 wherein said second bandwidth is a permissible transmission bandwidth for said second communication link.

4. The method as recited in claim 1 wherein said first communication link is a wired link.

5. The method as recited in claim 4 wherein said second communication link is a wireless link.

6. The method as recited in claim 5 wherein said first bandwidth is determined at said server utilizing a congestion control mechanism.

7. The method as recited in claim 5 wherein said second bandwidth is determined at a streaming agent located at an intersection of said wired link and said wireless link, wherein said second bandwidth is determined during resource allocation of said wireless link.

8. The method as recited in claim 1 wherein said first excess bandwidth is utilized to provide data packet retransmission over said first communication link.

9. The method as recited in claim 1 wherein said second excess bandwidth is utilized to provide forward error correction over said second communication link.

10. The method as recited in claim 1 further comprising transmitting streaming media from said server to a client device via said first communication link and said second communication link.

11. A non-transitory computer-readable medium having computer-readable program code embodied therein for causing a computer system to perform a method of enhancing transmission quality of streaming media, said method comprising:
  determining a wireless link bandwidth of a wireless link, wherein said wireless link bandwidth is determined during resource allocation of said wireless link;
  transmitting said wireless link bandwidth to a server over a wired network;
  receiving at least one streaming data packet from said server over said wired network; and
  transmitting at least one packet acknowledgement packet to said server over said wired network, said packet acknowledgement packet for allowing said server to determine a wired network bandwidth during transmission of said streaming media using observed endpoint roundtrip time of said at least one streaming data packet and said at least one packet acknowledgement packet at said server.

12. The non-transitory computer-readable medium as recited in claim 11, further comprising, provided said wireless link bandwidth is greater than said wired network bandwidth, utilizing a excess bandwidth to improve transmission quality in said wireless link, wherein said excess bandwidth is related to a difference of said wireless link bandwidth minus said wired network bandwidth.

13. The non-transitory computer-readable medium as recited in claim 12 wherein said excess bandwidth is utilized to provide forward error correction over said wireless link.

14. The non-transitory computer-readable medium as recited in claim 11 wherein said method is performed at a streaming agent located at an intersection of said wired network and said wireless link.

15. The non-transitory computer-readable medium as recited in claim 11 wherein said server is configured to transmit streaming media packets over said wired network and said wireless link to a client device.

16. A streaming media server comprising:
a bus;
a receiver coupled to said bus, said receiver for receiving at least one packet acknowledgement packet during transmission of streaming media for determining a first bandwidth for a first communication link of a network and for receiving a second bandwidth for a second communication link of said network;
a transmitter coupled to said bus, said transmitter for transmitting streaming media data packets;
a computer-readable memory coupled to said bus; and
a processor coupled to said bus, said processor for performing a method of enhancing transmission quality of streaming media, said method comprising:
determining said first bandwidth based on said packet acknowledgement packet such that said first bandwidth is determined using observed endpoint roundtrip time of said streaming media data packets and said at least one packet acknowledgement packet at said streaming media server;
determining which of said first bandwidth and said second bandwidth is greater;
determining excess bandwidth related to a difference between said first bandwidth and said second bandwidth; and
improving transmission quality of said streaming media packets based on said excess bandwidth.

17. The streaming media server of claim 16 wherein said method further comprises:
provided said first bandwidth is greater than said second bandwidth, utilizing a first excess bandwidth to improve transmission quality in said first communication link; and
provided said second bandwidth is greater than said first bandwidth, utilizing a second excess bandwidth to improve transmission quality in said second communication link.

18. The streaming media server of claim 17 wherein said first excess bandwidth is utilized to provide data packet retransmission over said first communication link.

19. The streaming media server of claim 17 wherein said second excess bandwidth is utilized to provide forward error correction over said second communication link.

20. The streaming media server of claim 16 wherein said first communication link is a wired link.

21. The streaming media server of claim 20 wherein said second communication link is a wireless link.

22. The streaming media server of claim 21 wherein said second bandwidth is determined at a streaming agent located at an intersection of said wired link and said wireless link, wherein said second bandwidth is determined during resource allocation of said wireless link.

* * * * *